United States Patent
Kulkarni

(10) Patent No.: US 8,380,950 B2
(45) Date of Patent: Feb. 19, 2013

(54) SYSTEM AND METHOD FOR DYNAMIC STORAGE DEVICE RECONFIGURATION

(75) Inventor: Gururaj Kulkarni, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 834 days.

(21) Appl. No.: 11/904,756

(22) Filed: Sep. 28, 2007

(65) Prior Publication Data

US 2009/0089522 A1    Apr. 2, 2009

(51) Int. Cl.
  *G06F 13/00* (2006.01)
  *G06F 17/00* (2006.01)
  *G06F 15/173* (2006.01)
(52) U.S. Cl. .................. 711/162; 707/654; 709/224
(58) Field of Classification Search .......... 711/161, 711/162, 112–113; 709/202–203, 28, 223–224, 709/253; 707/640, 654, 802
See application file for complete search history.

(56) References Cited

U.S. PATENT DOCUMENTS

| | | | | |
|---|---|---|---|---|
| 5,611,069 A | * | 3/1997 | Matoba | 711/114 |
| 7,337,331 B2 | * | 2/2008 | Yoshida | 713/193 |
| 7,359,975 B2 | * | 4/2008 | Martin et al. | 709/228 |
| 7,596,713 B2 | * | 9/2009 | Mani-Meitav et al. | 714/6 |
| 2001/0034728 A1 | * | 10/2001 | McBride et al. | 707/1 |

* cited by examiner

*Primary Examiner* — Tuan Thai
*Assistant Examiner* — Zhuo Li
(74) *Attorney, Agent, or Firm* — Dergosits & Noah LLP; Todd A. Noah

(57) ABSTRACT

A system and method provides for recovery of a backup process that has been interrupted by an address change for a connected backup storage device. A backup server may manage a data backup process from client computers to backup storage devices, each device having a unique address. Devices may be managed by storage node computers, which may occasionally reorganize its associated devices, causing some device address changes. This will interrupt the backup process since the server will not be able to match reorganized devices to known addresses. The present invention provides a method for querying the backup storage device, updating the server with the new address change, and continuing with the backup process. The present invention also provides a method for disabling the device from the backup process if the problem cannot be solved, then resuming the backup process.

14 Claims, 3 Drawing Sheets

```
bash-2.04# inquire -l
-l flag found, which has no effect on HP-UX systems -
    all LUNs are always searched.

scsidev@0.0.0:TEAC      DV-28E-N            E.6A|CD-ROM, /dev/rdsk/c0t0d0
scsidev@2.0.0:HP 73.4GST373454LC            HPC2|Disk, /dev/rdsk/c2t0d0
                                                 S/N: 3KP1S03N000007617E9VC
                                                 ATNN=SEAGATE ST373454LC          3KP1S03N
                                                 WWNN=5000C50003825E9C
scsidev@2.1.0:HP 73.4GST373454LC            HPC2|Disk, /dev/rdsk/c2t1d0
                                                 S/N: 3KP1RZS700007617G0DC
                                                 ATNN=SEAGATE ST373454LC          3KP1RZS7
                                                 WWNN=5000C5000382674C
scsidev@6.3.0:STK       L180                2.21|Autochanger (Jukebox), /dev/rac/c6t3d0
                                                 S/N: 1PBIC00213
                                                 ATNN-STK     L180                1PBIC00213 scsidev@6.3.1:IBM       ULTRIUM-TD2         53Y2|Tape, /dev/rmt/c6t3d1BESTnb
                                                 S/N: 1PBIC00214
                                                 ATNN=IBM     ULTRIUM-TD2         1PBIC00214 scsidev@6.3.2:IBM       ULTRIUM-TD2         53Y2|Tape, /dev/rmt/c6t3d2BESTnb
                                                 S/N: 1PBIC00215
                                                 ATNN=IBM     ULTRIUM-TD2         1PBIC00215 scsidev@6.3.3:IBM       ULTRIUM-TD2         53Y2|Tape, /dev/rmt/c6t3d3BESTnb
                                                 S/N: 1PBIC00216
                                                 ATNN=IBM     ULTRIUM-TD2         1PBIC00216 scsidev@6.3.4:IBM       ULTRIUM-TD2         53Y2|Tape, /dev/rmt/c6t3d4BESTnb
                                                 S/N: 1PBIC00217
                                                 ATNN=IBM     ULTRIUM-TD2         1PBIC00217 bash-2.04#
```

FIG. 2

SYSTEM AND METHOD FOR DYNAMIC STORAGE DEVICE RECONFIGURATION

TECHNICAL FIELD

The present invention relates generally to networked backup and storage systems, and specifically, to a system and method for dynamically reconfiguring a storage device on the network.

BACKGROUND OF THE INVENTION

A typical backup storage network system may include a backup server computer managing backup operations from client computers to storage node computers. The storage node computers in turn may deposit backup data to backup storage devices. These devices may be tape devices, optical disk devices or other types of devices capable of long-term data storage. The backup system may be managed by backup server software that initiates the backup process according to a schedule set by the system administrator. Each component of the backup storage network system may be connected via a storage area network, local area network, wireless network, wide area network or any other type of communication network familiar to one skilled in the relevant art. One will also appreciate that the backup storage network system components may be directly or remotely connected to one other.

The backup storage network system may permit backup and storage of data from multiple client computers to multiple storage node computers, each running a separate operating system. The backup storage devices may each be managed by separate storage node computers, which may in turn have a number of backup storage devices connected to them. In order to keep track of each backup storage device connected to a storage node, each backup storage device has at least its own serial number and unique address. This address may use a series of numbers consistent with the "bus.target.lun" format common to small computer system interface (SCSI) devices. This address may also be stored on the backup storage network server. One will appreciate that many types of address formats are possible. During a backup process, backup server software may identify and route data to the backup storage device using this address.

Occasionally, a storage node computer may reorganize the backup storage devices that it manages, causing the addresses for some of its backup storage devices to change. Reorganization of backup storage device addresses on the storage node computer may be a feature of the storage node computer's operating system, and can occur for any number of reasons known to one skilled in the relevant art. A consequence of this reorganization is that the storage node computer's internal list of addresses for its associated backup storage devices no longer matches the backup server's or backup server software's address list of backup storage devices. The storage node computers nor their associated backup storage devices do not automatically notify the backup server software of the reorganization, nor do they update the backup server software with the backup storage device address changes. The storage node computers may operate independently from the backup server and the backup server software.

The backup server may initiate a backup process according to a pre-set schedule managed by the backup server software. If this occurs after a reorganization, the server or server software will not be able to communicate with or access the backup storage devices because the backup storage devices addresses known to the backup server software will not match up to the reorganized backup storage addresses known to the storage node computers. This will cause the backup process to stall. The backup process therefore does not complete, defeating the purpose of the backup and putting data assets at risk. In addition, the system administrator may not be notified of the problem, so discovering the reason for the backup failure becomes an arduous task.

What is needed is an improvement to current storage area network systems that backup data to backup storage devices managed by storage node computers. What is needed is a way to allow storage node computers to reorganize their associated backup storage devices, while automatically and dynamically updating the backup server software and/or backup server computer of any backup storage device address changes resulting from the reorganization. What is further needed is a way to notify a system administrator when a backup process stalls or fails because of a reorganization. What is further needed is a way to resume an interrupted backup process once the problem has been identified.

BRIEF DESCRIPTION OF THE FIGURES

The present invention is illustrated by way of example and not limitation in the figures of the accompanying drawings, in which like references indicate similar elements, and in which:

FIG. 2 is an exemplary screenshot of the results of an inquiry command in a terminal window, according to one embodiment of the present invention.

DETAILED DESCRIPTION OF THE INVENTION

An embodiment of the present invention provides a system and method for updating a backup server with a backup storage device's new address if a storage node computer has changed that device's address after a reorganization process. This updating method prevents a backup process from being completely interrupted by such an event. An embodiment of the present invention may also cause a backup process to resume after the server has been updated.

In another embodiment, if the cause of a backup process interruption is not due to an incorrect backup storage device address, the present invention provides a method for disabling the subject backup storage device from the backup process and resuming backup to the next device. The present invention may place the problematic backup storage device into a service mode, thereby allowing a system administrator to manually repair the problematic device before allowing backup of data to that device. Alternatively, the present invention may permit data to be transferred to another backup storage device that is without fault. The present invention may also cause notification messages to be displayed to the system administrator in order to apprise him of backup storage device issues encountered during a scheduled backup process.

General Backup System Architecture

Figure 1:
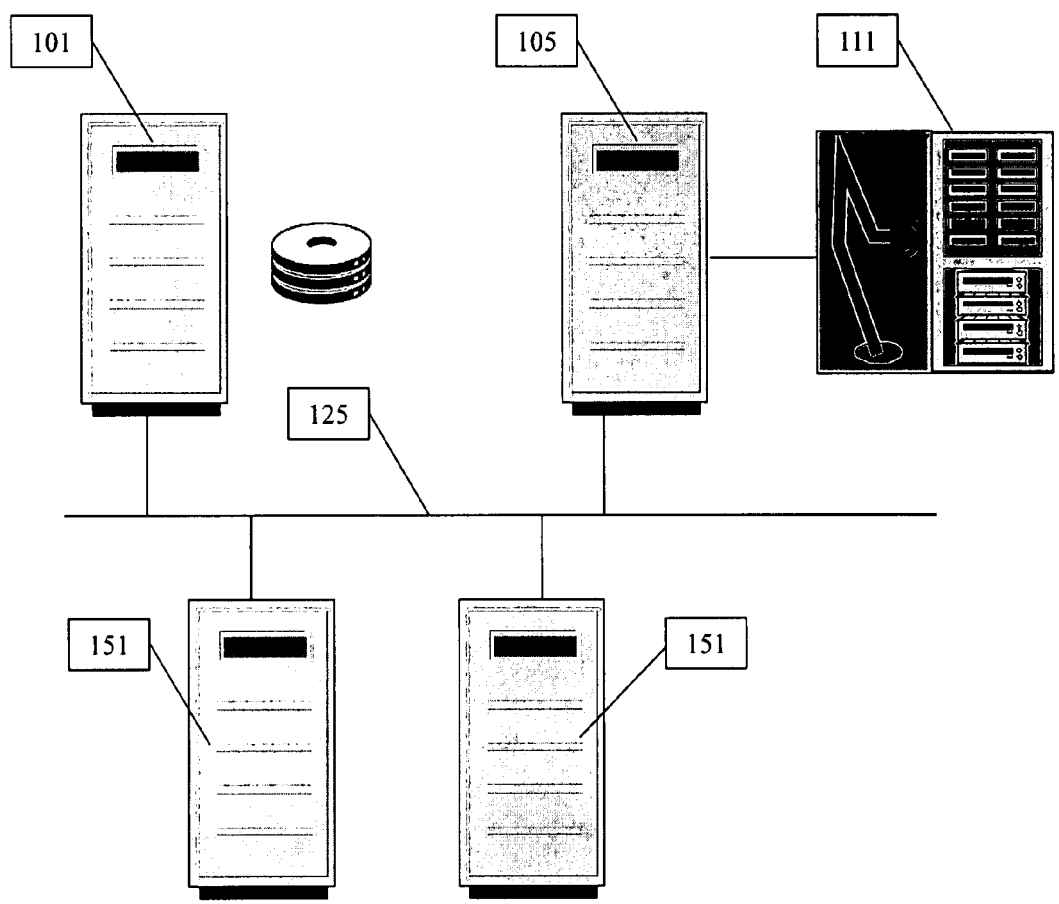
FIG. 1 is an exemplary block diagram showing the system components of a storage area network, according to one embodiment of the present invention.

An organization may rely upon a remote or local backup storage system for managing and implementing a backup process in order to protect its data assets, as shown in FIG. 1. This may be in the form of a network with a backup server connected to one or more client computers that create and/or store data. In FIG. 1, the backup server computer 101 running the backup server software is connected over a network 125 to one or more storage node computers 105 that in turn manage one or more backup storage devices 111. The backup server computer may use backup server software to coordinate the movement of data from the client computers 151 to the storage node computers 105, which move the data to backup storage devices 111. The backup storage devices 111 may be tape, optical disk or another type of device capable of long-term storage of data. The backup storage devices 111 may be referred to in the art as "jukeboxes" or "autochangers."

Each component within the system may be connected over a network 125 or may be directly connected. One skilled in the art will recognize that the terms "network," "computer network," and "online" may be used interchangeably and do not imply a particular network embodiment or topography. In general, any type of network (e.g., LAN, WAN, or Internet) may be used to implement the online or computer networked embodiment of the present invention. The network may be maintained by a server (other than the backup server), or the network may be serverless. Similarly, any type of protocol (e.g., HTTP, FTP, ICMP, UDP, WAP, SIP, H.323, NDMP, TCP/IP) may be used to communicate across the network.

General Backup Server Software Configuration and Commands

The backup server computer 101 may be managed a system administrator using various backup server software applications. One common backup server software management program is EMC NetWorker, which is owned by the assignee of the present invention. The backup server software may coordinate scheduling of automated backup processes, and may manage access to all the components of the backup system, including the backup server computer 101, the client computers 151 and the storage node computers 105.

The backup server software may cause communication and tasks to be run between the backup server computer 101 and the storage node computers 105 using background software applications known as daemons. These daemons may or may not be expressly written by a user or system administrator, but may be initiated by the backup software application itself as a remote procedure call (RPC). For example, the backup server software on backup server computer 101 may call a program called "nsrmmgd" to communicate with a program called "nsrlcpd" that controls a backup storage device 111 on storage node computer 105. The program, nsrmmgd, may be a media management daemon that resides on the backup server computer 101 or backup server software and serves to manage all of the enabled backup storage devices on the storage node computers on behalf of the backup server system. The program, nsrlcpd, may be a library control program daemon that resides on a storage node computer and may provide a uniform interface to the nsrmmgd daemon. The storage node computer may have multiple iterations of nsrlcpd running, with each iteration corresponding to a certain backup storage device. The backup server software may have a single nsrmmgd daemon running to interface with all the iterations of nsrlcpd. One skilled in the relevant art will appreciate that nsrmmgd and nsrlcpd are exemplary daemon names, and that other backup server software programs may utilize similar daemons with different names. Use of the example daemons is merely illustrative, and one will appreciate that other daemons or software applications may be substituted without departing from the scope of this disclosure.

The backup server software on the backup server computer 101 may be responsive to certain commands inputted by a system administrator. For example, to list all of the backup storage devices associated with a backup server, a system administrator may issue the "inquire" command at the storage node computer to which the storage devices are connected. FIG. 2 is an exemplary screenshot showing the output from an inquire command. In terminal window 201, a user has entered the inquire command at shell prompt 205. The system echoes back a list of connected backup storage devices. In this illustration, the devices are connected via SCSI connections, and are listed by SCSI address 211, with each backup storage device having its own unique address. One skilled in the relevant art will appreciate that the devices may be connected over fibre channel switches as well. The SCSI address 211 follows the bus.target.lun format common to SCSI addresses. For example, in SCSI address 211, for device scsidev@6.3.0, its unique address is at bus 6, target 3, lun 0. One skilled in the art will appreciate that lun is an abbreviation of the term "logical unit number."

Each backup storage device may also be identified by its unique serial number (S/N) 221. In FIG. 2, device scsidev@6.3.0 has serial number 1PBIC00213. One skilled in the relevant art will appreciate that while backup storage device addresses may be re-used or re-organized, the serial number associated with a specific backup storage device will not change.

Another command that may be used by the backup server software on backup server computer 101 is "dvdetect," that may be similar to the inquire command on some systems. The dvdetect command differs from the inquire command in that dvdetect does not echo an output for display to the user, but rather supplies information to the backup server computer 101 and/or the backup server software. In some backup systems, the dvdetect command is a device autodetection instruction that searches or scans for backup storage devices attached to or associated with the storage node computers on the network. This may enable the backup server software to automatically configure detected backup storage devices to work with the backup process. A system administrator may also use the dvdetect command to configure a backup storage device on a storage node computer. One will appreciate that similar commands may be used to perform the same task.

During one type of backup process, the backup server software on backup server computer 101 will use a dvdetect or similar command to detect and configure available backup storage devices 111 connected to storage node computers 105 on a network 151. Once the backup storage devices 111 are configured, the backup server computer 101 may use the nsrmmgd or similar daemon to manage or control all enabled backup storage devices 111. The nsrmmgd or similar daemon may initiate an instance of the nsrlcpd or similar daemon for each backup storage device 111 controlled by the backup server software on backup server computer 101. One skilled in the relevant art will appreciate that the nsrlcpd daemon may run on a configured storage node computer 105, and the nsrmmgd daemon may run on the managing backup server computer 101.

Overcoming Backup Process Interruptions Due to Device Reconfiguration

Once the backup server software on backup server computer 101 has detected and configured the storage node computers 105 and the associated backup storage devices 111, the backup server software generally does not re-run the autodetection and configuration commands. During a backup process, the backup server computer 101 and the backup server software will refer to the configuration settings previously detected and stored.

Since the storage node computers 105 may operate independently of the backup server 101, the backup server computer 101 or backup server software may not constantly monitor the activities of the storage node computers 105. The storage node computers 105 may run their own maintenance programs or other self-initiated or user-initiated processes.

On occasion, a storage node computer 105 may reorganize device addresses for the backup storage devices 111 connected to it. One skilled in the art will appreciate that there are many reasons why a storage node computer 105 may perform this type of task. The end result is that the backup storage device addresses for the backup storage devices 111 may change.

After such a backup storage device address reorganization, an inquire command issued at the shell prompt 205 in a terminal window 201 show a different SCSI address 211 than prior to reorganization. There may be backup storage devices listed at SCSI address 211 before and after reorganization, but the particular backup storage device assigned to that address may not be the same after reorganization—the only difference may be that the serial number 221 will be different since the listed backup storage device is different. Alternatively, a listed backup storage device may have the same serial number 221, but a different bus, target or lun identifier.

After reorganization, the storage node computer 105 may continue to operate normally, and a system administrator or user may not recognize that a reorganization has occurred. The backup server software may initiate a scheduled backup process to backup data assets to backup storage devices 111 associated with the backup server computer 101 and connected to storage node computers 104. The backup process may be monitored by the nsrmmgd daemon that may, in turn, cause instances of the nsrlcpd daemon to run. However, because of the reorganization, the nsrlcpd daemon will not be able to control or access its associated backup storage device 111. This is one way a backup process may fail after backup storage device 111 address reorganization by the storage node computer 105.

In order to permit the backup process to proceed, an embodiment of the present invention adds instructions to the backup server software, adding or complementing the capabilities of the nsrmmgd, nsrlcpd or similar daemons. The steps comprising the present invention are illustrated in the exemplary flowchart in FIG. 3. One skilled in the relevant art will appreciate that these steps are merely illustrative, and that they may be varied or performed in a different order without departing from the spirit or scope of the present invention.

Figure 3:
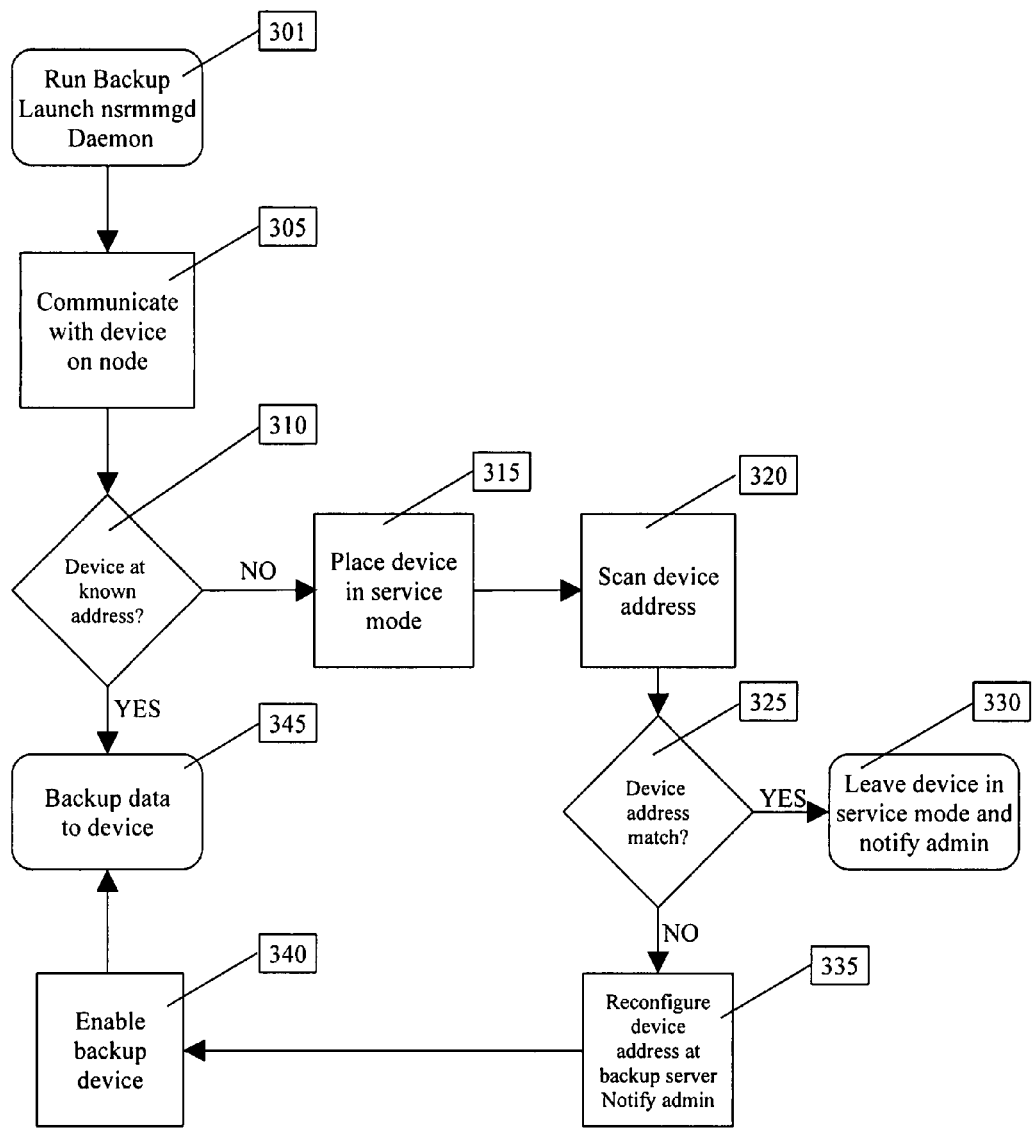
FIG. 3 is an exemplary block diagram illustrating some of the steps of an embodiment of the present invention.

As depicted in FIG. 3, the backup process may proceed after an initial configuration step as described previously (step 301). This initial backup storage device configuration step occurs only once. The backup server software may cause an instance of the nsrmmgd or equivalent daemon to run, which may manage the backup process by communicating with associated backup storage devices using the nsrlcpd or equivalent daemon. (See step 305 of FIG. 3). If the backup storage devices are properly configured, then the backup server software may successfully locate the devices in step 310, and may cause data to be backed up to those associated backup storage devices in step 345.

According to this embodiment of the present invention, whenever the backup server software encounters a problem with an associated backup storage device 111, the backup server software will automatically cause the storage node computer to place the backup storage device 111 in "service mode," as shown in step 315. This mode temporarily disables or brings the problematic backup storage device 111 offline in order to permit diagnosis and repair. In one embodiment, the backup storage device itself may physically be disabled when placed in service mode. In another embodiment, the storage node computer may classify a problematic backup storage device as being in service mode when a problem is encountered, and as such, will not use the problematic device to store data.

One will appreciate that while there may be many applicable terms for placing the backup storage device into a service-type mode. Use of the term "service mode" is not meant to limit or narrowly categorize aspects of the present invention. Further, one will appreciate that there are many ways to place the backup storage device into a service mode, from adding instructions to existing daemon programs, to constructing specific daemons to seek out and make repairs on problematic backup storage devices. In one embodiment, the nsrlcpd daemon may be disabled as part of placing the device 111 into service mode.

Other embodiments of the present invention permit flexibility as to when the backup server software issues an instruction to place a problematic backup storage device in service mode. For example, in one embodiment, a backup storage device 111 does not enter into service mode until the backup server software has encountered a set number of errors or issues with the backup storage device. For example, in this embodiment, the backup storage device 111 may be assigned one or more attributes, such as "error count" and "max error count." The value for the "max error count" may be user modifiable, or may be set to some default value. If the backup server software encounters a problem with a backup storage device 111, then the error count may be incremented by one. Once the backup server software notes that the backup storage device 111's error count has reached or surpassed the max error count, then this embodiment may cause the problematic backup storage device 111 to enter into a service mode. One skilled in the relevant art will appreciate that there are many ways to limit or further the entry of a backup storage device into service mode, and that aspects of the present invention permit such flexibility depending upon the needs of the user without departing from the spirit or scope of this disclosure.

Once a problematic device has been placed in service mode, it is an aspect of the present invention to provide notice of this event. As such, the present invention may provide for one or more notification messages to be displayed to the user or system administrator. Since, at this step, the backup server software has not yet diagnosed the issue with the backup storage device 111, the notification message may be generalized to simply note that a problem has occurred or that the backup process has been interrupted. Alternatively, the message may specify the issue if the backup server software has identified the problem. One will appreciate that many customizable messages may be relevant and applicable here.

In addition to sending notification messages to the user or administrator, the backup server software may also notify or be notified that the backup process is not proceeding normally. For example, the nsrlcpd daemon may send an error message to the nsrmmgd daemon that a problem has been encountered with a backup storage device, and that the backup storage device should be placed in service mode. This error message is different from the notification message that may be displayed to the user. After receipt of the error message, the nsrmmgd daemon may disable the nsrlcpd daemon and initiate a device autodetection command to the storage node computer to which the problematic device is attached. This is shown in step 320 of FIG. 3. This autodetection command may be the dvdetect command or other similar command.

The results of the autodetection command may be received by the backup server software through the nsrmmgd daemon or other daemon. Similar to the initial configuration step, the results may consist of a listing of the backup storage device's address. In step 325 of FIG. 3, the backup server software will verify the received device address with the address known by the backup server software.

If the previously known backup storage device address and the presently received backup storage device address does not match, then the present invention will cause the backup server software to initiate a dvdetect or similar backup storage device configuration instruction to reconfigure the backup storage device and update the backup server software with the new address (step 335 of FIG. 3). This reconfiguration instruction may be part of the dvdetect command, or may be a separate instruction issued by the backup server software or a daemon controlled or managed by the backup server software. One will appreciate that the automatic reconfiguration aspect of the present invention may be accomplished in a number of ways within the scope of this disclosure.

Since it is an aspect of the present invention to notify the user or administrator of events during the backup process, the present invention may cause a second notification message to be displayed to a user or system administrator, updating him with these events. The system administrator may follow up with an inquire command and may check the logs of the backup process to ensure that valuable data assets have been successfully backed up to the storage devices.

In some instances, a backup storage device may interrupt the backup process for reasons unrelated to a storage node computer reorganization. For example, the backup storage device may be broken, or have other physical or software-based problems. In such a case, when the backup server software issues requests the address of the problematic backup storage device, the result may reveal that the problematic backup storage device's address may already match the address previously stored by the backup server software. As such, reconfiguration will not solve the problem. Instead, the present invention may cause the backup server software or storage node computer to keep the problematic storage device in service mode.

The present invention may issue a notification message to the user or system administrator, informing him that the problematic backup storage device may need to be physically examined. (Step 330 of FIG. 3). The notification message may further provide that the error is not due to a storage node computer reconfiguration of the subject device. A system administrator may then need to manually identify the problem with the device, fix the device, and once fixed, return the device to the storage node computer so that it may participate in a future backup process. Another embodiment of the present invention may store a log on the backup server computer recording the errors encountered with backup storage devices for later access by the system administrator or other interested user.

Following reconfiguration or other repair of a problematic backup storage device, the present invention will cause the backup storage device to return from service mode (step 340 of FIG. 3). This may involve restarting the nsrlcpd daemon by the nsrmmgd daemon, thus enabling the nsrlcpd daemon and bringing the subject device out of service mode. Once the device has been re-enabled, and the backup server software has been reconfigured with all of the associated backup storage devices, the backup server software may resume the backup process (step 345 of FIG. 3). In addition, the backup server software may execute an inventory of the associated backup storage devices to check volumes with the server software media database. This may be performed by the nsrmmgd daemon or its equivalent, or another daemon.

By automatically identifying a problematic backup storage device, scanning the problematic backup storage device to reveal its address, comparing the newly scanned address with the previously known address, and configuring the backup server software to match the newly scanned address for the problematic backup storage device, an embodiment of the present invention provides for an automated dynamic method for self-diagnosing and fixing a known issue with certain backup storage devices and certain storage node computers. One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, the present invention is disclosed with reference to identification and recovery of a problematic tape device. One will recognize that the method for dynamically reconfiguring a reorganized backup storage device by a backup server software program may apply to disk devices as well.

What is claimed is:

1. A method comprising:

executing, by a server coupled to a network, a first daemon program for a backup process, wherein when executed, the first daemon program instructs a second daemon program on a storage node computer coupled to the network and corrected to a backup storage device to locate the backup storage device at an address for the backup storage device stored on the server;

receiving an error message from the storage node computer, the error message indicating that the backup storage device is not located at the stored address; and transmitting an instruction to the storage node computer, the instruction for placing the backup storage device into a service mode so that the backup storage device can be at least one of diagnosed and repaired.

2. The method of claim 1, further comprising:

transmitting a request to the storage node computer requesting a verification address for the backup storage device; and receiving and comparing the verification address for the backup storage device with the stored address.

3. The method of claim 2, wherein when the verification address does not match the stored address, the method further comprises:

replacing the stored address with the verification address; and transmitting a second instruction to the storage node computer, the second instruction for placing the backup storage device out of service mode, and for resuming the backup process with the backup storage device.

4. The method of claim 2, wherein when the verification address does match the stored address, the method further comprises providing a repair notification message.

5. The method of claim 1, further comprising providing a notification message.

6. A method comprising:

executing, by a server coupled to a network, a first daemon program for a backup process, wherein when executed, the first demon program instructs a second daemon program on a storage node computer coupled to the network and connected to at least two backup storage devices to locate the at least two backup storage devices at the addresses for the at least two backup storage devices stored on the server;

receiving an error message from the storage node computer, the error message indicating that one of the at least two backup storage devices cannot be located at its stored address; and transmitting an instruction to the storage node computer, the instruction for placing the unlocated backup storage device in service mode so that the backup storage device can be at least one of diagnosed and repaired.

7. The method of claim 6, further comprising:

transmitting a request to the storage node computer requesting a verification address for the unlocated backup storage device; and receiving and comparing the verification address for the unlocated backup storage device with the stored address.

8. The method of claim 7, wherein when the verification address does match the stored address, the method further comprises providing a repair notification message; and transmitting a second instruction to the storage node computer, the second instruction for resuming the backup process with the located backup storage device.

9. The method of claim 6, further comprising providing a notification message.

10. The method of claim 7, wherein when the verification address does not match the stored address, the method further comprises:

replacing the stored address with the verification address; and transmitting a second instruction to the storage node computer, the second instruction for placing the unlocated backup storage device out of service mode, and for resuming the backup process with the unlocated backup storage device.

11. A system comprising:

a server coupled to a storage node computer via a network, wherein the storage node computer is connected to a backup storage device, and wherein the server stores an address for the backup storage device and is configured for:

executing a first daemon program for a backup process, wherein when executed, the first daemon program instructs a second daemon program on the storage node computer to locate the backup storage device at the address for the backup storage device stored on the server;

receiving an error message from the storage node computer, the error message indicating that the backup storage device is not located at the stored address; and transmitting, by the server, an instruction to the storage node computer, the instruction for placing the backup storage device into a service mode so that the backup storage device can be at least one of diagnosed and repaired.

12. The system of claim 11, wherein the server is further configured for:

transmitting a request to the storage node computer requesting a verification address for the backup storage device; and receiving and comparing the verification address for the backup storage device with the stored address.

13. The system of claim 12, wherein when the verification address does not match the stored address, the server is further configured for:

replacing the stored address with the verification address; and transmitting a second instruction to the storage node computer, the second instruction for placing the backup storage device out of service mode, and for resuming the backup process with the backup storage device.

14. The system of claim 12, wherein when the verification address does match the stored address, the server is further configured for providing a repair notification message.

* * * * *